July 21, 1970     E. S. TAMM     3,521,100
D.C. MOTOR WITH CAST MAIN YOKE AND LAMINATED INTERPOLE
YOKE AND METHOD OF FORMING Filed March 26, 1969     3 Sheets-Sheet 1

INVENTOR:
EMIL S. TAMM
BY John N. Sutherland
ATTORNEY

July 21, 1970  E. S. TAMM  3,521,100
D.C. MOTOR WITH CAST MAIN YOKE AND LAMINATED INTERPOLE
YOKE AND METHOD OF FORMING Filed March 26, 1969  3 Sheets-Sheet 3

United States Patent Office 3,521,100
Patented July 21, 1970

3,521,100
D.C. MOTOR WITH CAST MAIN YOKE AND LAMINATED INTERPOLE YOKE AND METHOD OF FORMING
Emil S. Tamm, Fort Smith, Ark., assignor to Baldor Electric Company, Fort Smith, Ark., a corporation of Missouri
Filed Mar. 26, 1969, Ser. No. 810,514
Int. Cl. H02k 1/10, 3/20, 23/24
U.S. Cl. 310—186                                7 Claims

ABSTRACT OF THE DISCLOSURE

Improving the commutation of cast yoke, shunt wound, D.C. motors when operated from a source of alternating current through a silicon-controlled rectifier system by providing a laminated flux path for interpolar generated flux internally of, but concentric with, the cast yoke, thereby to substantially segregate the intra-yoke portion of the main magnetic field from the intra-yoke portion of the interpole magnetic field.

---

The invention relates to D.C. type shunt wound motors which are intended to be used under conditions where the source of supply is alternating current, and the motor is energized thereby through a solid state rectifier system, and particularly to improving the commutation of such motors when operated under such circumstances.

D.C. motors are conventionally provided with a cast iron or other solid, integral yoke of material having acceptable magnetic permeability, which serves the dual purpose of constituting a shell or housing for the motor, and also the metallic path for the magnetic flux generated by the field coils on the main poles. The field poles may be an integral part of such a yoke, or may be separately cast and appropriately secured to the yoke. Unlike the situation with alternating current motors, the field flux in a direct current type of motor is of constant direction and almost negligible variation in magnitude, although its concentration may be greater between poles than at poles.

When such D.C. motors are fed with solid state rectified alternating current, the aforesaid constancy of the field flux no longer exists and poor commutation results.

In an effort to improve the commutation of such motors, the yokes have heretofore been provided with either integral or separable "interpoles." "Interpoles" are pole pieces located midway between main poles, and provided with windings usually having a substantially lesser number of turns than the main poles, and the windings thereof are conventionally connected in series with the armature windings, i.e., through the commutator. The primary function of the interpoles has been to improve commutation, and is based upon the principle that armature reaction tends to be neutralized by placing auxiliary poles in the axis of commutation, and exciting them by the same current that flows through the armature, the winding of the auxiliary poles or interpoles being so designed that the magnetomotive force of the armature is either exactly balanced, or else slightly over-compensated. In this way, the main field may be varied through a wide range without producing sparking, the interpoles always producing a field of the proper strength to reverse the current in the armature coils undergoing commutation.

Application of the interpole expedient to D.C. motors which are fed by solid state rectified alternating current has heretofore met with far less satisfaction in the improvement of commutation than has the application of that expedient to the same motor when fed with direct current.

Consequently, one object of the present invention is to make the interpole principle as effective in improving commutation of D.C. motors fed with solid state rectified alternating current as it has been with such motors fed with direct current.

The invention is predicated upon the confirmation of a suspicion aroused in the course of a studied effort to imagine why it is that the interpole principle of improving commutation is less effective when a given motor is fed with solid state rectified alternating current than when the same motor is fed with current which was direct as generated—a suspicion which, in retrospect, makes one skilled in the art more than a little ashamed that he did not think of it before. That suspicion was that the flux generated in one main pole and traversing the inter-main-pole-arc of the yoke to the next main pole, while of constant direction, was of sufficiently changing magnitude when the field windings were fed by solid state rectified alternating current, to have some of the eddy current induction traits of alternating current machinery, in that: the magnetic flux in each inter-main-pole-arc of the cast iron yoke was inducing, in that arc, eddy currents whose magnetic flux was (in a substantial part of that yoke arc) bucking the interpole-generated flux, and hence tending to reject its entry into that part of the cast iron yoke. If that suspicion be true, it appeared that the problem was somewhat akin to the problem which, in alternating current machinery, had been solved by laminating the magnetic flux path.

Succinctly, therefore, the present invention involves providing a laminated path for the interpole flux, preferably by building a stack of substantially circular laminations which have pole piece parts projecting radially inward in appropriate angular spacing, so as to constitute an interpole core at each desired location when the several laminations are secured together; and then securing the stack of laminations within the cast iron yoke. If desired, such laminations may also include parts projecting radially inward at locations and of magnitude such as to constitute main pole cores, but preferably the main pole cores are either cast or separately laminated, and bolted or riveted radially through the stack of interpole laminations to the cast iron yoke. This arrangement provides relatively distinct inter-pole, intra-yoke flux paths for the respective (i.e., "main" and "interpole") flux fields, and thereby substantially segregates the interpole flux fields, and thereby substantially segregates the interpole flux from the main field flux in the composite yoke.

One complete embodiment of the invention, together with some alternatives, is disclosed in the accompanying drawings, in which.

Figure 1:
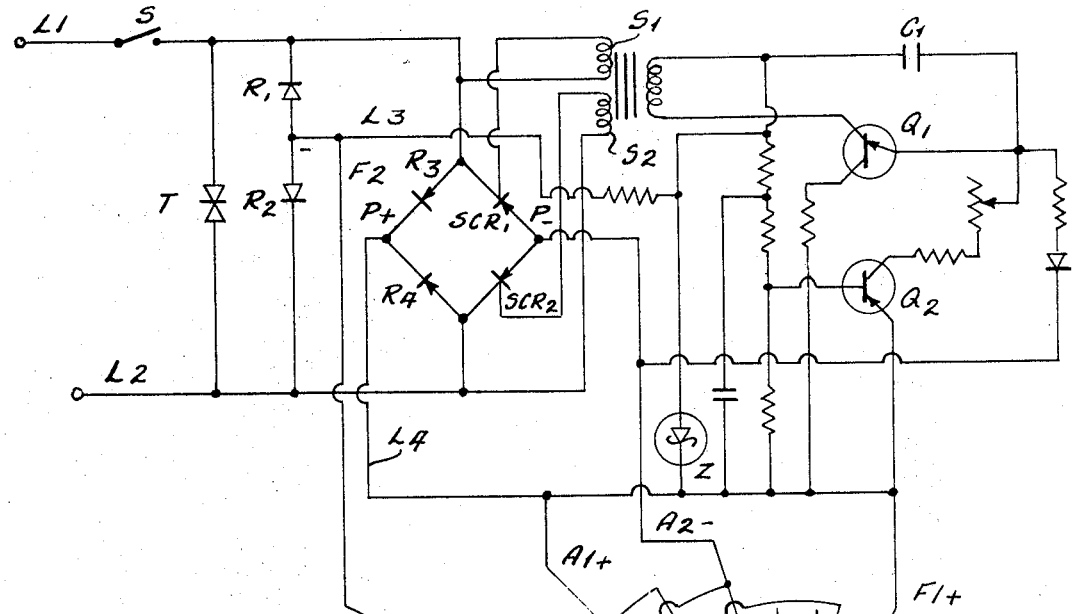
FIG. 1 is a diagrammatic view showing conventional circuitry for operating a direct current type motor with solid state rectified alternating current, and hence typifies the situation to which the invention is applied.

Referring first to FIG. 1 for a diagrammatic illustration of a motor and the circuitry of the type to which the invention pertains, it will be understood that lines $L_1$ and $L_2$ are connected through appropriate protective devices to a source of alternating current. A switch S may be manually operated to control the supply of alternating current energy to the circuitry disclosed as desired. Adjacent the switch S, or preferably ahead of all other devices in the control circuit, a suitable surge protector, such as a conventional thyrector T, is provided and connected directly to the respective mains $L_1$ and $L_2$. Paralleling the surge protector T is another circuit containing rectifiers $R_1$ and $R_2$ which are oppositely addressed so that the polarity between them is negative; and from between those rectifiers, there extends a conductor $F_2$ which connects with the negative terminal of the several series connected main field windings W of a shunt wound D.C. type motor diagrammatically shown; and likewise from between those rectifiers, there extends a line $L_3$ to a resistor and other control devices, to be later described. Also connected across lines $L_1$ and $L_2$ is a bridge circuit containing rectifiers $R_3$ and $R_4$ so oriented in the circuit that point P+ is the positive terminal of the bridge circuit and point P− is the negative terminal thereof. However, the flow of energy through the bridge circuit is controlled by a pair of silicon-controlled rectifiers $SCR_1$ and $SCR_2$, which are respectively triggered by pulses received from secondary coils $S_1$ and $S_2$ of a transformer, the primary of which is energized only when a condenser $C_1$ becomes charged to a predetermined voltage and discharges, thereby sending a pulse of current through the primary of the transformer which induces a voltage in the secondaries $S_1$ and $S_2$, which respectively trigger the silicon-controlled rectifiers $SCR_1$ and $SCR_2$, so that the bridge circuit becomes conductive and rectified current is fed to the motor through line $L_4$, with branches $A_1$ and $F_1$ leading respectively to the armature and to the main field windings MW of the shunt wound motor shown. The armature circuit is connected in series with a bank of parallel connected interpole windings IW, and completed back to point P− of the rectifier bridge circuit through conductor $A_2$, while the main field winding circuit is completed back to line $L_3$ through conductor $F_2$, as above described.

In the control circuitry illustrated in FIG. 1, element Z is a Zener diode which serves as a voltage regulator, element $Q_1$ is a uni-junction transistor which fires when the voltage across condenser $C_1$ has reached the discharge value, and thereby transmits a pulse current to the primary of transformer T, but the provision of transistor $Q_2$ in the circuit, in combination with the several resistor elements as shown, assures that the desired time delay will ensue between the time at which voltage is first impressed upon condenser $C_1$ and its discharge. Otherwise, the elements of the control circuitry illustrated cooperate in a manner well understood by those skilled in the art for, as indicated hereinbefore, the entire circuitry, including the motor windings, as shown in FIG. 1, is well known in the prior art.

As indicated previously, motors of the type with which the present invention is concerned are those wherein the rotor windings are connected in shunt circuit relationship with the main field windings, but in series circuit relationship with interpole windings. In the form illustrated n FIG. 1, the rotor, or armature, and its windings are designated A, the main field poles are designated M and their windings W. Between successive main field poles M, there are interpoles I, whose windings IW are connected in shunt circuit relationship with each other, but, en masse, in series circuit relationship with the armature coils.

Figure 2:
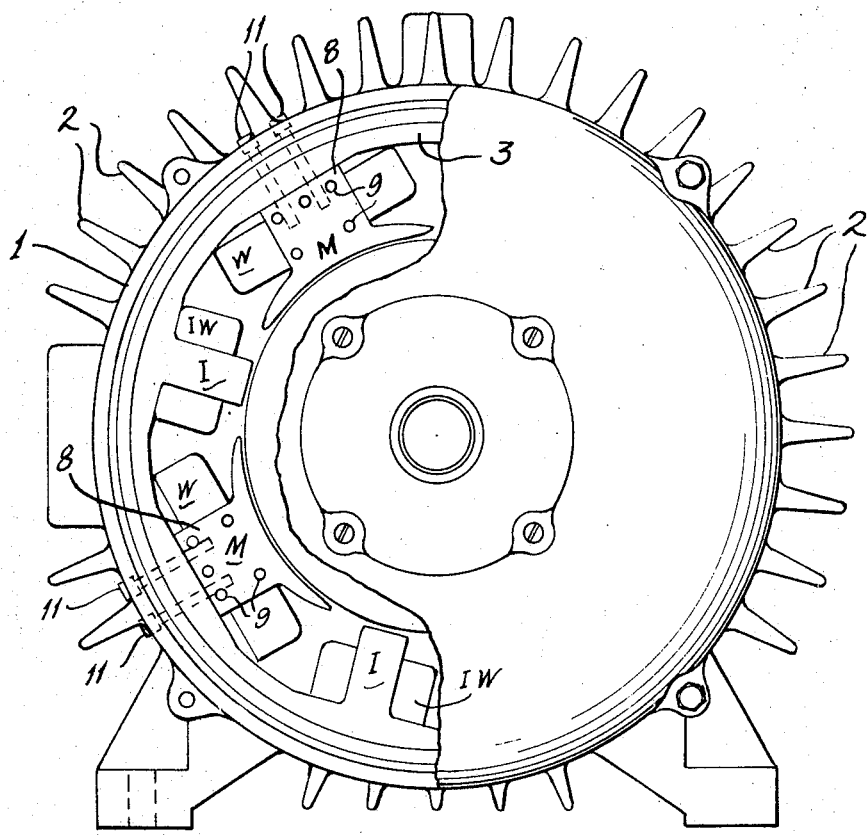
FIG. 2 is a sectional view through a motor whose stator parts are constructed in accordance with the present invention.

Motors of the character to which the present invention pertains are conventionally provided with a stator which includes a cast iron housing 1 having a series of fins 2 on the exterior surface, and on interior surface which, in some instances, may include pole parts, but, in most instances, is turned cylindrical and provided with means for attaching pole pieces at the appropriate locations. Such pole pieces conventionally include a plurality of main poles, and may or may not include an equal number of interpoles disposed between the main poles. In the embodiment of the invention shown in FIG. 2, however, the cast iron housing 1 is not provided with any integral pole pieces, but has appropriate provision for mouting such pole pieces, and serves not only as the frame or shell of the motor, but also as the yoke through which the magnetic flux passes between successive main poles. In particular, the present invention contemplates that the interpole structure be built up of laminations whose outer periphery fits the machined inner periphery of the cast iron ring 1. The preferred form of such lamination is shown in FIG. 3, and is intended for use in situations where the main pole cores are separately provided either in the form of castings, or in the form of stacks of laminations which, in either event, are appropriately secured to the interior of ring 1 in a manner such that the cast iron ring 1 constitutes the yoke which provides the principal path for the magnetic flux traveling in iron between the bases of successive main poles.

Figure 3:
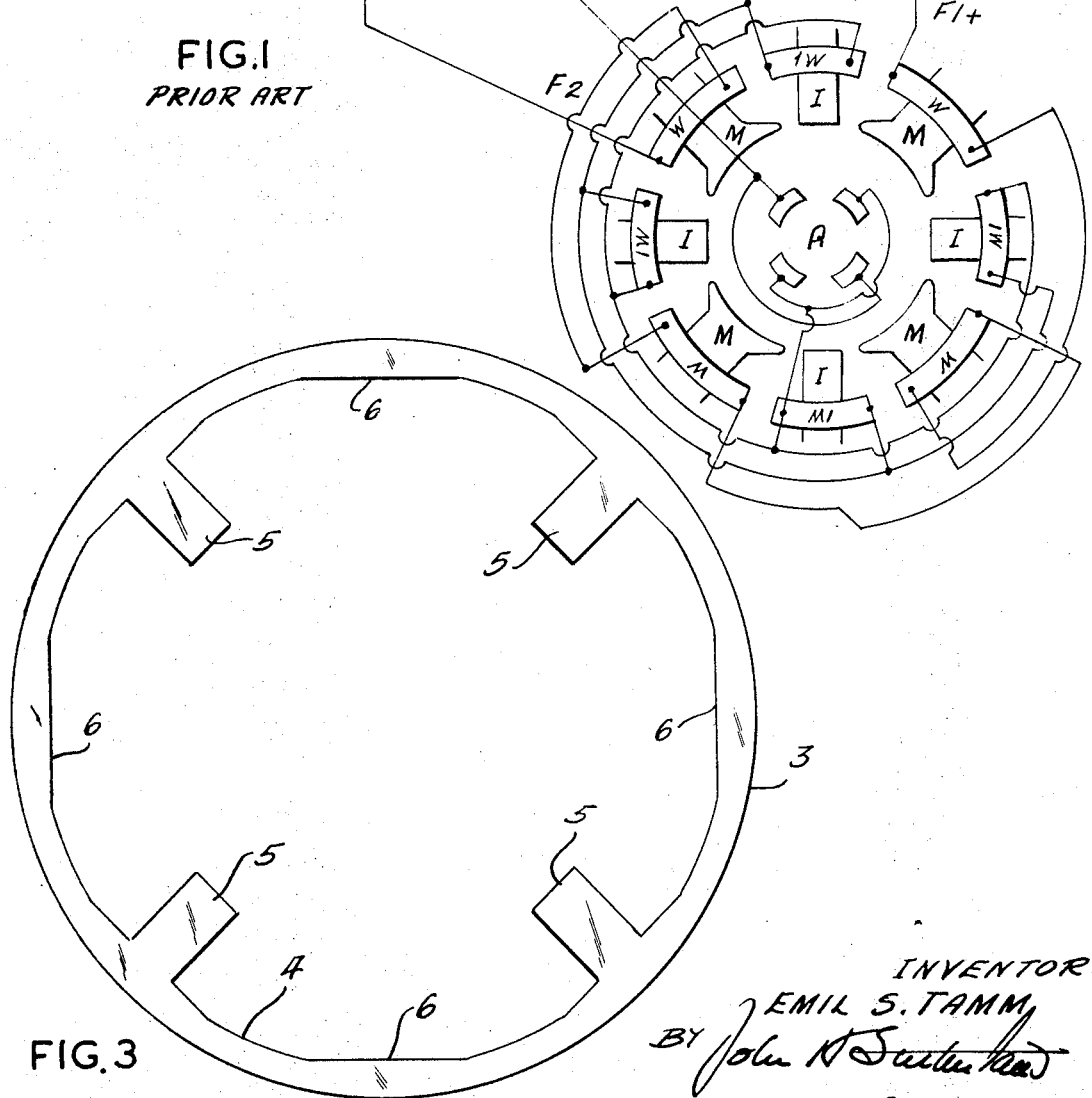
FIG. 3 is a plan view of an interpolar lamination suitable for use in constructing the interpole yoke of the present invention.

The laminations shown in FIG. 3 have a substantially circular exterior periphery 3, and are of dimensions such as to provide a relatively tight, even drive, fit with the interior periphery of ring 1. Extending radially inward from the inner periphery 4, there are interpole parts 5 spaced, for illustration, 90° apart. Halfway between successive interpole parts 5, the interior periphery 4 is provided with a chordal flat 6, at which appropriate main pole parts may be mounted in a manner hereinafter to be described. While the lamination shown in FIG. 3 is a complete circle, it will be understood that when and if desired, the complete circle may be made up of smaller arcs which complement each other to complete the circle when assembled within the ring 1.

Figure 4:
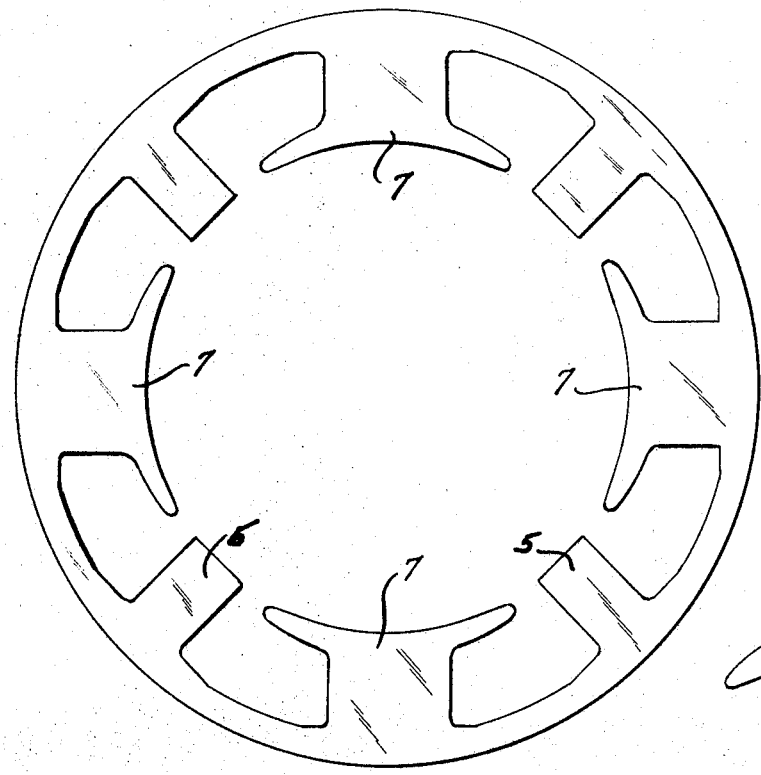
FIG. 4 is a view corresponding to FIG. 3, but showing a lamination which includes parts which, when stacked, constitute main pole cores.

Another form of lamination is shown in FIG. 4, and differs from the lamination shown in FIG. 3 only in that main pole parts 7 form an integral part of the lamination at the location where flats 6 appear in FIG. 3.

Figure 5:
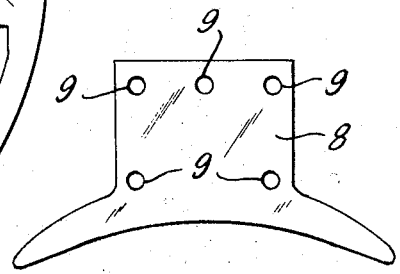
FIG. 5 is a plan view of a main pole lamination for use in assembly with the interpolar lamination shown in FIG. 3.
Figure 6:
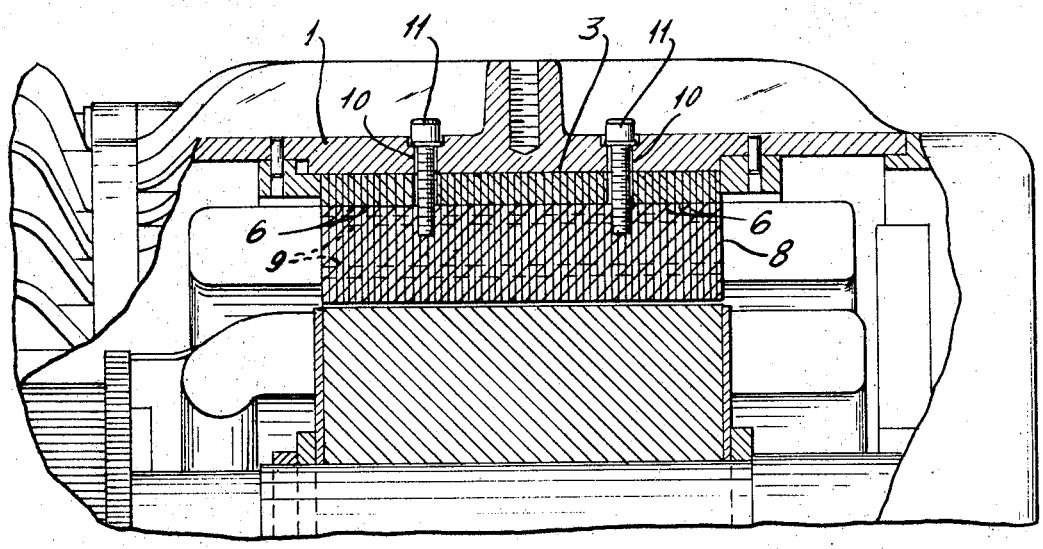
FIG. 6 is an enlarged axial sectional view of a stator having a cast iron main field yoke, and a laminated interpole field yoke embodying laminations of the kind shown in FIG. 3, and having assembled therewith main pole laminations of the kind shown in FIG. 5.

In assembling the laminations of either FIG. 3 or FIG. 4 within the cast iron ring 1, the laminations may be stacked outside the ring, and transferred, en masse, into it, or stacked in situ within the ring as desired. In either event, the laminations must be clamped, or otherwise secured, together compactly, but preferably without rupturing the varnish, or other electrical insulating material, which is conventionally applied to the laminations employed in the construction of cores for electro-magnetic equipment.

Where laminations of the character illustrated in FIG. 3 are employed, and after they are assembled within a ring 1, an appropriate group of main pole laminations 8, having a configuration such as that shown in FIG. 5, is compacted and staked, as by bolts or rivets extending through holes 9, and such an assembly then mounted on the interior of the laminated interpole ring at the location of the several flats 6 therein. Such mounting may be accomplished, as illustrated in FIG. 6, by drilling the assembly of frame 1 and interpole ring to provide holes 10, as shown in FIG. 6; drilling and threading at least the radially outward half of the stack of main pole laminations 8 so that they match the locations of the holes 10, and then inserting bolts 11 so that their heads are on the outside of frame 1, their shanks extend through the laminated interpole ring, and their threads engage the stack of main pole laminations 8. Cast iron main pole pieces can be applied in like manner. When the intra-yoke portions of both the interpole magnetic circuit and the main field magnetic circuit are formed of the same laminations as shown in FIG. 4, the assembly is simplified, but the degree of segregation between the intra-yoke portions of the two magnetic flux circuits is compromised.

The specific material of which the laminations shown in FIGS. 3, 4 and 5 are made is a matter of designer's choice as long as it is ferromagnetic, thin and preferably coated with something to minimize electrical conductivity between face-to-face laminations. Electrical grade or motor grade silicon steel sheets, or cold-rolled steel sheets with or without annealing or grain orientation, are suitable materials from which to cut the laminations.

While, to facilitate the disclosure, certain theories of operation have been advanced in the foregoing description, it is not to be understood that the invention depends upon those theories or, in particular, that all, or even most, of the intra-yoke main field flux is necessarily forced or crowded out of the laminated interpole ring and into the cast iron ring 1 as is believed to be the case. But regardless of the scientific principles responsible for it, the fact is that commutation is substantially improved when, in motors of the kind described operated under the conditions described, the interpole cores are part of a laminated ring structure concentric with the usual cast iron yoke or other integral structure (such as a piece of pipe) of ferromagnetic material heretobefore employed for such purposes.

While one complete embodiment of the invention has ben disclosed in detail, and some alternatives suggested, it is to be understood that the foregoing description and the accompanying drawings are not intended to be a complete compendium of all possible variations and adaptations which may be expected to occur to those skilled in the art in the application of the invention in different environments.

Having thus described the invention, what is claimed and desired to be secured by Letters Patent is:

1. In the art of direct current motors which have a main magnetic field and an interpole magnetic field, the method of improving commutation when the motor is fed with solid state rectified alternating current which comprises, forming a main field yoke of unitary material having magnetic permeability, and forming an interpole field yoke of laminated material having magnetic permeability.

2. The method of claim 1 in which the interpole field yoke laminations have arcuate portions extending between sucessive interpoles, and a jut projecting radially inward of said portions at an interpole location to constitute a part of an interpole core.

3. The method of claim 2 in which a second jut, of substantially greater area, projects radially inward of said portions at main pole locations to constitute a part of a main pole core.

4. A shunt wound direct current motor for energization by alternating current through a solid state rectifier comprising, a rotor, an integral stator housing of magnetic material forming intra-pole yokes, a plurality of main poles in magnetic circuit relationship with each other through different intra-pole yokes of said stator housing, interpoles between each of said main poles, and means providing a laminated path for the maganetic flux which traverses said interpoles and substantially segregates it from that which traverses said intra-pole yokes.

5. The motor of claim 4 wherein said stator housing is a casting having an array of heat-dissipating fins on its exterior.

6. The motor of claim 4 wherein said laminated path is composed of laminar rings each of which includes radially inwardly projecting pole pieces, circumferentially spaced in the same degree as and disposed midway between successive ones of said main poles.

7. An electric motor having a main magnetic field and an interpole magnetic field, a yoke of unitary material having magnetic permeability extending between successive poles of said main magnetic field, and said interpole magnetic field having a yoke of laminated material having magnetic permeability extending between successive poles of said interpole magnetic field.

References Cited

UNITED STATES PATENTS

| | | | |
|---|---|---|---|
| 2,340,669 | 2/1944 | Lange | 310—186 X |
| 2,492,016 | 12/1949 | Stokes | 310—216 |
| 2,493,414 | 1/1950 | Morrison | 310—217 X |
| 2,512,351 | 6/1950 | Lynn | 310—217 |
| 3,229,130 | 1/1966 | Drouard | 310—54 |

WARREN E. RAY, Primary Examiner

U.S. Cl. X.R.

29—596; 310—216, 258